Figure 1:
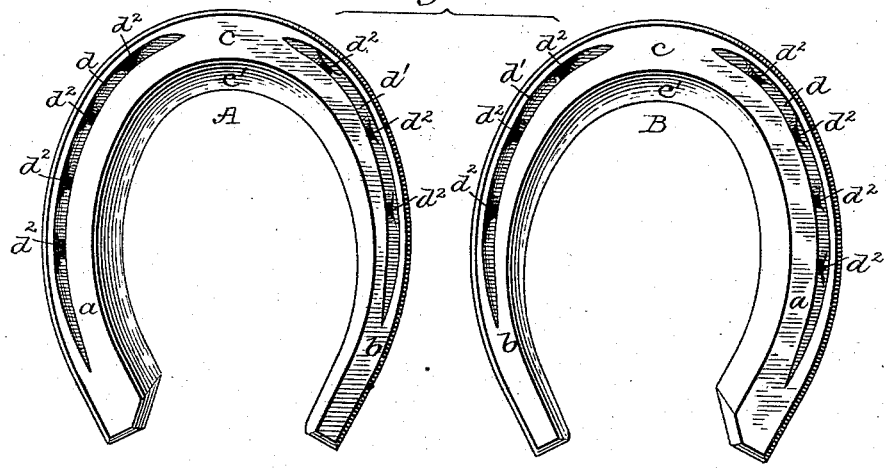

(No Model.)  4 Sheets—Sheet 1.

C. H. PERKINS.
SIDE WEIGHTED BLANK AND BLANK BAR FOR USE IN MAKING SIDE WEIGHTED HORSESHOES.

No. 470,400.  Patented Mar. 8, 1892.

Attest:
Philip F. Larner
Howell Little

Inventor:
Charles Henry Perkins
By _____ Attorney

THE NORRIS PETERS CO., PHOTO-LITHO., WASHINGTON, D. C.

(No Model.) 4 Sheets—Sheet 2.
C. H. PERKINS.
SIDE WEIGHTED BLANK AND BLANK BAR FOR USE IN MAKING SIDE WEIGHTED HORSESHOES.
No. 470,400. Patented Mar. 8, 1892.
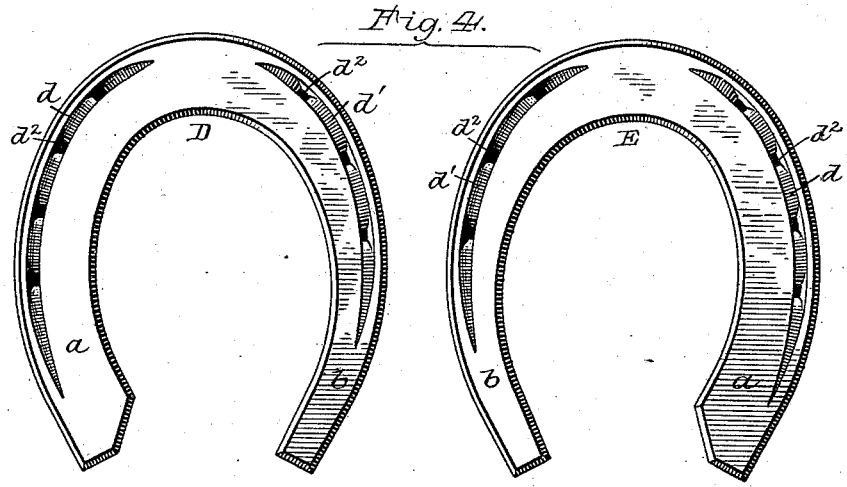
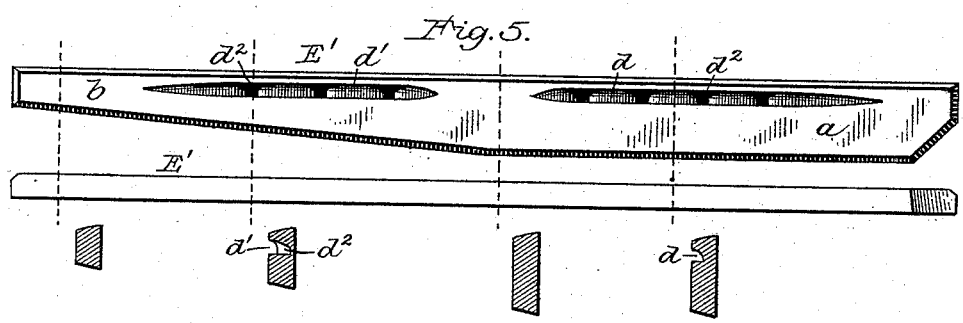
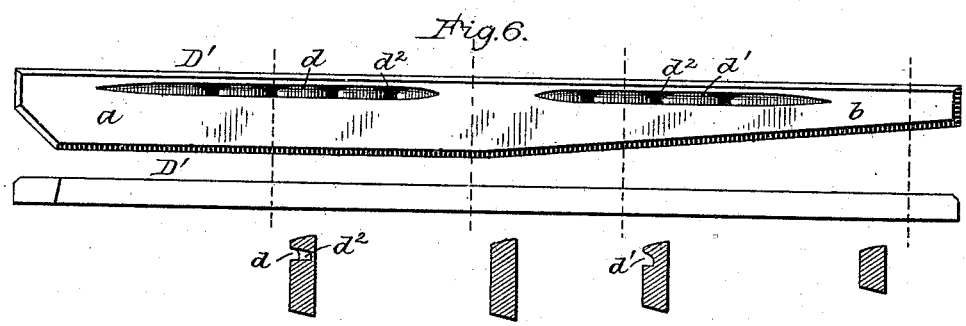
Attest:
Philip F. Larner
Howell Bartle
Inventor:
Charles Henry Perkins
By [signature]
Attorney

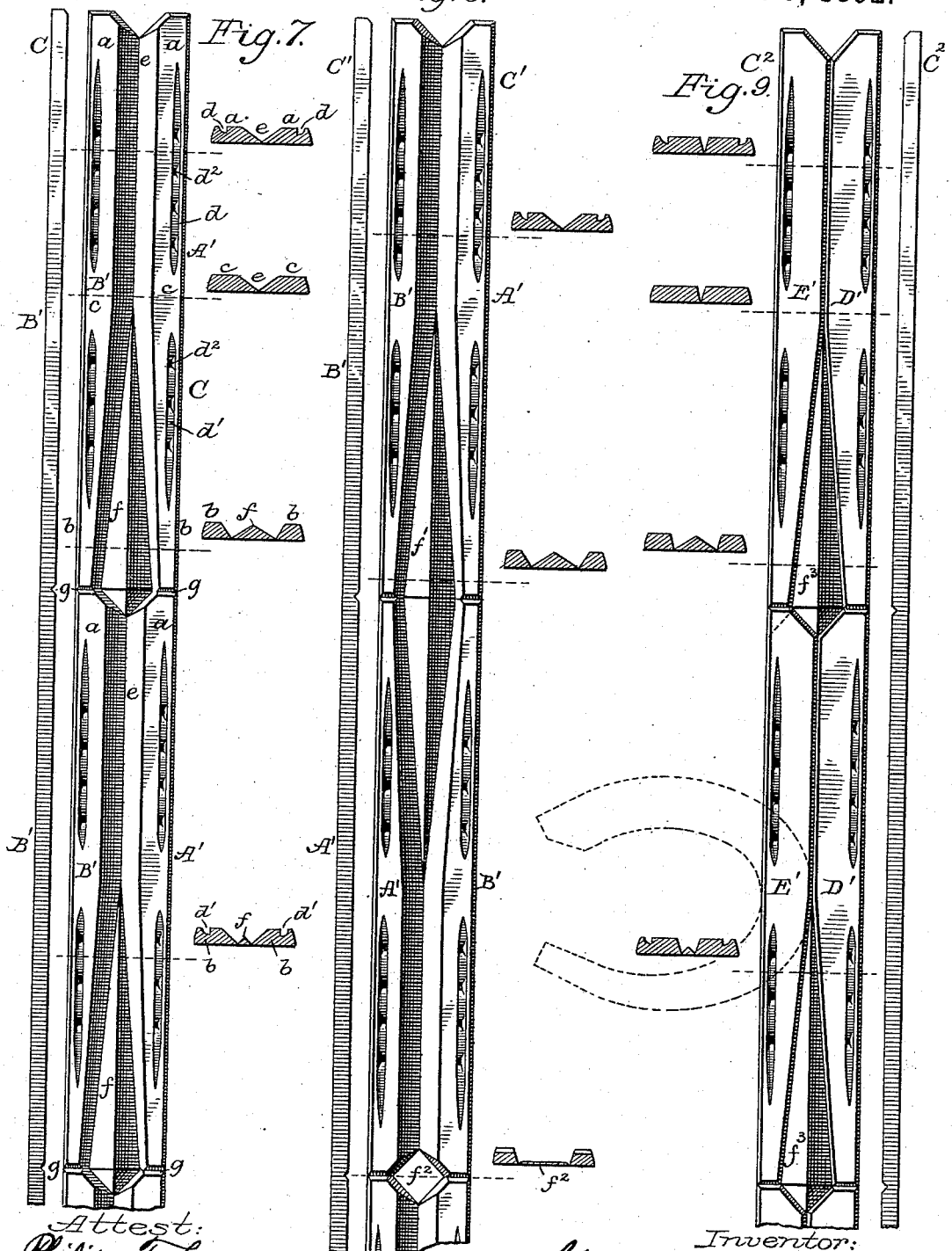

(No Model.)     C. H. PERKINS.     4 Sheets—Sheet 4.
SIDE WEIGHTED BLANK AND BLANK BAR FOR USE IN MAKING SIDE WEIGHTED HORSESHOES.
No. 470,400.     Patented Mar. 8, 1892.
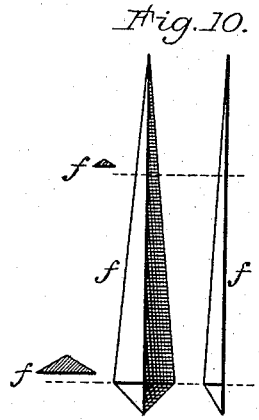
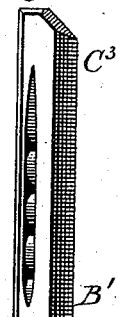
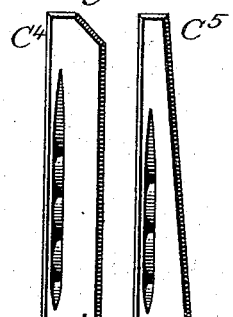
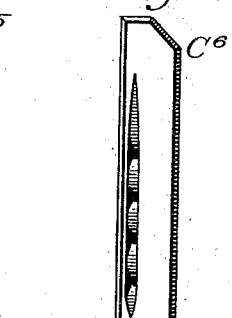
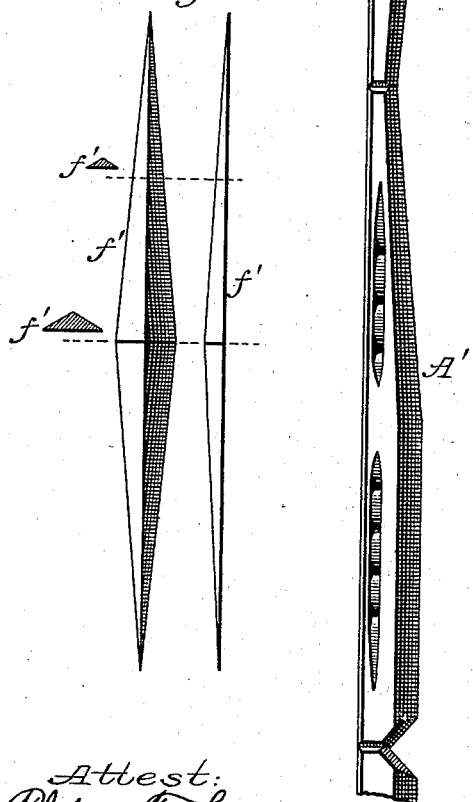
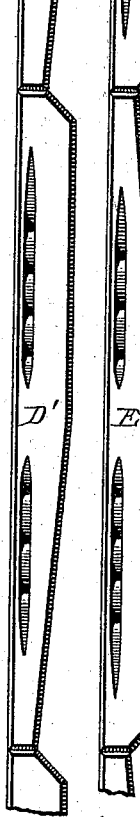
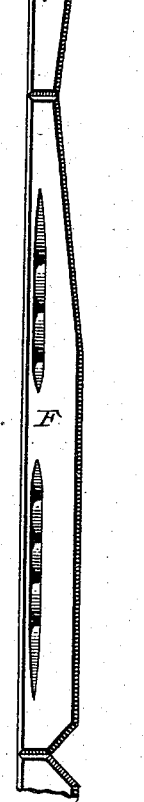

UNITED STATES PATENT OFFICE.

CHARLES HENRY PERKINS, OF PROVIDENCE, RHODE ISLAND, ASSIGNOR TO THE RHODE ISLAND PERKINS HORSE SHOE COMPANY, OF JERSEY CITY, NEW JERSEY.

SIDE-WEIGHTED BLANK AND BLANK-BAR FOR USE IN MAKING SIDE-WEIGHTED HORSESHOES.

SPECIFICATION forming part of Letters Patent No. 470,400, dated March 8, 1892.

Application filed May 9, 1891. Serial No. 392,209. (No model.)

*To all whom it may concern:*

Be it known that I, CHARLES HENRY PERKINS, of the city and county of Providence, in the State of Rhode Island, have invented certain new and useful Side-Weighted Blanks and Blank-Bars for Use in the Production of Side-Weighted Horseshoes; and I do hereby declare that the following specification, taken in connection with the drawings furnished and forming a part of the same, is a clear, true, and complete description of the several features of my invention.

It is well known to be important in very many instances to unequally or variably distribute the weight of metal in a horseshoe with respect of different portions of the hoof to which it is to be applied. The desirability of providing for an excess of weight at the toes of shoes is being widely recognized, and toe-weighted shoes have been found to possess substantial value for general use, whether on speedy roadsters or on draft-animals, and I have heretofore devised novel methods and means for their production, as disclosed in part in several Letters Patents issued to me March 24, 1891. In a "side-weighted shoe," as its name implies, there is a substantial excess of metal at the one side thereof, in some cases so great that if the shoe should be divided into two parts on a central line at the toe, one of the sides would be from one-third to one-half heavier than the other, but somewhat lesser differences in weight are usually required. Side weighting is practically restricted to hind shoes, whereas toe weighting is employed in both hind and front shoes. Side-weighted shoes may in one sense be also considered as being both side-weighted and toe-weighted shoes, inasmuch as the metal thereof in front of a lateral central line is generally of somewhat greater weight than the metal at the rear of said line, and therefore, when in use, side-weighted shoes afford good results, which are due to toe-weighted shoes. There is, however, a radical difference between these two classes of shoes, in that while the toe-weighted shoes are uniform and interchangeable as "rights" and "lefts," the side-weighted shoes are specially paired and are rights and lefts. Side-weighted shoes have been heretofore specially made by hand with a view to meeting requirements in each particular case for correcting habits of striking or interfering; or, in other words, they have been used in the sense of intended cures for said habits. The almost universal tendency is for horses to wear away their hind shoes more rapidly on the outer side than at the inner side, resulting in an uneven tread, and the habits referred to have become so general as to warrant a belief on my part that they are mainly forced or developed by the use of horseshoes of the usual form and as ordinarily made and applied, and from experience I believe that the development of said habits will be materially lessened by the use of toe-weighted shoes and wholly obviated by the regular use of side-weighted shoes, thereby successfully preventing an evil by the use of the same means, which sometimes fail when used as a mere remedy for the same evil, if fully developed. Moreover, the extra area of the heavy side of the shoe results in a correspondingly greater durability, as compared with ordinary shoes of the same weight as the side-weighted shoes. I have therefore (as I believe for the first time) devised methods, means, blanks, and blank-bars for the manufacture of side-weighted shoes and have produced such shoes with a view to their general use as hind shoes, and as valuable substitutes in that special connection for any or all of such other forms of merchant shoes as have been heretofore manufactured.

After describing my novel blanks and blank-bars in connection with the drawings the features deemed novel will be specified in the several appropriate clauses of claim hereunto annexed.

Figure 2:
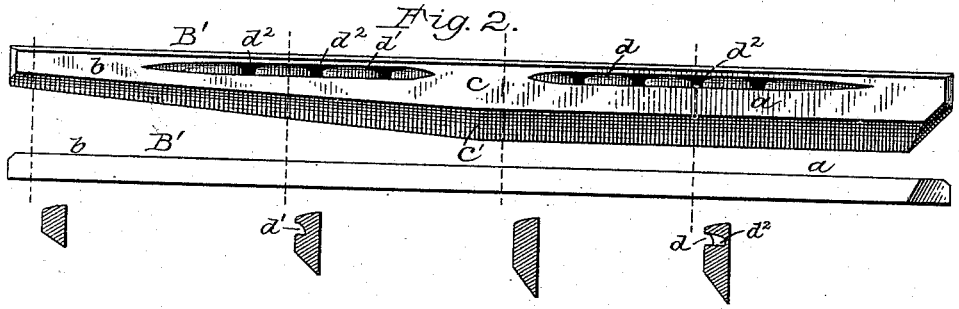
Figure 3:
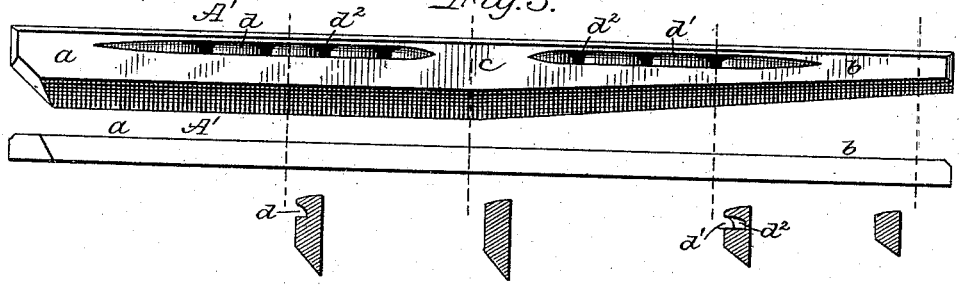

Referring to the drawings, Figure 1 illustrates in bottom view a pair of side-weighted shoes in their best form as developed from blanks or blank-bars embodying my present invention, the left-hand shoe being the right and the other the left. Figs. 2 and 3 illustrate in bottom view, edge view, and in several sections the blanks embodied, respectively, in the left and right shoes, Fig. 1. Fig. 4 illustrates a pair of plain side-weighted shoes. Figs. 5 and 6 illustrate the blanks embodied in the shoes, Fig. 4. Fig. 7 illustrates in bottom view, edge view, and in several sections one of my blank-bars in its preferred form. Fig. 8 illustrates in the same manner one of my blank-bars containing the blanks of Figs. 2 and 3, but in a modified arrangement thereof in the bar. Fig. 9 illustrates a blank-bar somewhat similar to that of Fig. 7, but containing the plain blanks of Figs. 5 and 6, and as embodied in the shoes of Fig. 4. Figs. 10 and 11 respectively illustrate the waste metal or scrap-pieces from the bars, Figs. 7 and 8. Fig. 12 illustrates one of my single-line bars containing both right and left blanks. Fig. 13 illustrates a pair of my single-line bars, the blanks in one being all rights and in the other all lefts. Fig. 14 illustrates my side-weighted blanks, having a slightly-increased length of the wide portion thereof.

The horseshoes shown in Fig. 1 are of a fancy type adapted to use on trotters and roadsters, A denoting the right and B the left shoe of the pair. Each shoe is developed from a special blank, the shoe B from the blank B' of Fig. 2, and the shoe A from the blank A' of Fig. 3. Each shoe and blank has a wide side or end $a$ and a narrow side or end $b$, and the toe portions $c$ in both of the shoes, and their blanks are the same in area and weight and substantially the same in form; but they so far differ as to their interior contour as is incident to the merging of the lines of the inner edges of the wide and the narrow sides. These shoes and blanks are variably beveled at their inner edges, said bevel at the toe portion, as at $c'$, being quite flat and wide, but gradually lessened or narrowed at one heel on the narrow side, but substantially uniform on the wide side. Both shoes have nail-scores $d$ and $d'$, respectively, on the wide and narrow sides, and these scores are provided with nail-head points $d^2$, of which there are preferably four on the wide or heavy side and three on the narrow or light side. The said nail-scores and head-points are best developed in and while forming the blanks, although blanks without nail-scores may be profitably produced, leaving the scores to be located and developed by each farrier in accordance with his own views as to length and location, or said scores may extend from end to end of the blank, leaving each farrier free to determine as to the number of nail-head points desired as well as to their particular location.

Inasmuch as the prime object of my invention is to secure blanks in which there is a substantial excess of metal at the one side of the central or toe line, it is obvious that the edge lines of the blank may be considerably varied with respect of each other without substantial departure from my invention, so long as their variation results in forming a wide heavy side and a narrow light side. In some grades of my side-weighted shoes the tapering of the narrow side is commenced at or about the front nail-hole on that side, thus securing for the entire toe of the shoe a uniform width; but satisfactory results will accrue if from the central toe-line to one end of the blank it is wide and substantially of uniform width, and tapered or narrowed to the opposite end, because this form assures an appropriate and specially desirable distribution of metal and a symmetrical shoe; but should the blank be tapered with uniformity from the wide end to the narrow end, a serviceable shoe could be formed therefrom, although the weight of metal at the toe, would be undesirably lessened, and the excess of weight at the heavy side would be located unduly near the heel; but nevertheless such tapered horseshoe-blanks would be novel in the art and trade and would embody a substantial portion of the gist of my invention.

It will be obvious that the blanks illustrated can be developed in rolled blank-bars after the manner of producing some forms of blank-bars containing the weighted blanks, and also that said bars may contain the blanks arranged in one, two, or more lines or rows, involving, however, substantial differences as compared with toe-weighted blank-bars. In a double-line toe-weighted blank-bar the blanks may be either offset with relation to each other, as in the best form, or arranged end to end and evenly side by side, as in a less desirable form of double blank-bar, involving of necessity intervening waste scrap metal, and in a single toe-weighted blank-bar the blanks are arranged end to end, both ends of each blank being alike. In a double side-weighted blank-bar, however, the blanks are not offset with relation to each other, and they should be side by side, and this of necessity involves intervening scrap metal between the narrow sides (or portions) of each pair of blanks, and for securing the right and left forms of blank in a double bar the narrow ends of each pair are preferably abutted against the wide ends of the next pair in the bar; but the narrow ends of any pair of blanks may abut against the narrow ends of an adjacent pair, and then of necessity at their wide ends they will abut against the wide ends of another adjacent pair of blanks. In a blank-bar containing a single line of side-weighted blanks all of the blanks may be of one form—*i. e.*, either all rights or all lefts—if the narrow ends of the blanks abut against the wide ends of adjacent blanks; but if in a single-line bar the blanks are to be half of them rights and half lefts each narrow end must abut against the narrow end of one of the next blanks in line and the wide end against the wide ends of the other adjacent blank.

It is now to be understood that the side-weighted blank described constitutes the main feature of my present invention, regardless of the particular form of the bar in which it may have been developed. It is also to be understood that, although single-line side-weighted blank-bars are of my invention, and that a certain method and means devised by me for producing such bars will be made the subject of appropriate claims in another application for patent, and that although if such bars should be rolled edgewise and in a single line and thereafter provided with nail-head scores, they will involve less waste or scrap as compared with the double-line bars, there are certain economic advantages in matters of heat, labor, and rolling which accrue from producing the double-line blank-bars, and said advantages warrant substantial preferences in that direction.

In Fig. 7 the blank-bar C is of the double-line form, the blanks A' and B' being as shown in Figs. 2 and 3, and as embodied in the shoes, Fig. 1. It will be seen that the wide portions $a\,a$ of each pair of blanks are separated by a substantially straight groove $e$, and that the narrow sides $b\,b$ are separated by tapering portions of metal, which I will term "scrap-pieces" $f$. These scrap-pieces, as shown detached in Fig. 10, may be so tapered and so beveled at their sides by the die-rolls as to contain comparatively little metal. At the heel-parting lines, as at $g$, as well as along the inner edge lines of the blanks, the metal is so nearly parted that separation may be more or less readily accomplished.

In the blank-bar C' of Fig. 8 the blanks A' and B' are arranged with the ends of the blanks abutting against the corresponding ends of other blanks, and this affords a double (i. e., both lateral and longitudinal) pairing of blanks in rights and lefts, and the waste scrap-pieces $f'$ are of twice the length of the pieces $f$ before described. In this form of my blank-bar there are other small thin scrap portions, as at $f^2$, between the abutting wide ends of the blanks, the substantially corresponding portions of waste in the blank-bar, Fig. 7, being integral with the pieces $f$.

The heavy or plain shoes D and E of Fig. 4 and the plain blanks D' and E' of Figs. 5 and 6 differ from those of Figs. 1, 2, and 3 only in that they are only beveled at their inner edges, so far as will be conducive to the convenient working of the metal by the die-rolls, and in the blank-bar $C^2$ of Fig. 9 the blanks are arranged as in Fig. 7. The waste or scrap portions $f^3$ in this bar are or need be no heavier than the pieces $f$, and hence as these blanks are heavier than those in the bars C and C' the percentage of waste is correspondingly lessened.

With those manufacturers of horseshoes who roll their own metal it is obvious that the scrap incident to the rolling of my double side-weighted blank-bars can be utilized to the best advantage; but any maker of horseshoes who relies upon the use of merchant-rolled blank-bars will naturally seek in the market such bars as contain no waste metal; or, in other words, a preference will be given to my single-line blank-bars, from which even the stub or end waste can and would be eliminated.

In Fig. 12 I show one of my single-line blank-bars $C^3$, in which the blanks A' are rights and the alternating blanks B' are lefts, such bars being of any desired length; but they will preferably contain an even number of blanks for affording them in pairs, as when for sale, for instance, by the single bar to farriers.

In Fig. 13 I show a pair of my single-line blank-bars $C^4$ and $C^5$, these being separately formed by appropriate die-rolls. Such blank-bars are essentially paired, because in the blank-bar $C^4$ the blanks D' are all lefts and in the bar $C^5$ the blanks E' are all rights.

In Fig. 14 I show a blank-bar $C^6$, in which the blanks F are tapered from the front nail-hole at the narrow side, thus slightly increasing the length of the straight portion and affording a uniform width at and across the toe portion of the blank and of a shoe made therefrom.

Each of the several blank-bars shown and described embodies my novel side-weighted-horseshoe blanks, and in all of said bars there are lines of blanks connected end to end and also with due reference to affording blanks in pairs, suitable for right and left side-weighted shoes.

The main or characteristic features of my side-weighted blanks and blank-bars are not dependent upon the location of the nail-scores adjacent to and parallel with the straight side of the blank, inasmuch as said straight edge need not always be the outer edge of the blank, it being obvious that either of the blanks D' or E' could be oppositely bent in forming a shoe—as indicated, for instance, in dotted lines in Fig. 9—but when so used the nail-scores are located one near the short parallel edge and the other near the inclined edge, or, in other words, the two scores are inclined to each other, and this variation of the arrangement and location of the nail-scores would constitute the difference between a plain right blank and a left blank, according to the direction it was to be bent in forming a shoe. If, however, the blanks are to be used as now indicated, a corresponding slight variation should be made in the contour of the end of the wide heel, as indicated in dotted lines in Fig. 9, at the wide heel of the blank, and on the dotted-line shoe there shown.

It will be understood that my side-weighted blanks will be of various sizes and weights, according to the various sizes and grades of shoes, and therefore special die-rolls are used for forming each size of blank, and such rolls as devised by me will be made the subject of a separate application for Letters Patent.

Having thus described my invention, I claim as new and desire to secure by Letters Patent—

1. A side-weighted-horseshoe blank which has parallel edges for a portion of its length and is tapered throughout the remainder of its length for affording in a shoe made therefrom a wide central or toe portion, one wide and heavy side, and a narrow tapered and light side, substantially as described.

2. A side-weighted-horseshoe blank having a wide end, a narrow end, a straight outer edge, and a variably-beveled inner edge, which for a portion of the length of the blank is substantially parallel with the outer edge and for the remaining portion is inclined from the wide portion to the narrow end of the blank, substantially as hereinbefore described.

3. In a horseshoe-blank bar, a series of blanks connected end to end, each blank having one straight edge and one edge partially straight and parallel with the straight edge and partially angular or inclined thereto for the remainder of its length, substantially as described.

4. A blank-bar containing side-weighted-horseshoe blanks arranged in right and left pairs side by side and separated by a substantially straight groove for a portion of their length and by a tapering waste piece or scrap for the remainder of their length, substantially as described.

5. A blank-bar containing side-weighted-horseshoe blanks arranged side by side in pairs of rights and lefts, each blank beveled at its inner edge, and the blanks of each pair separated in part by a substantially straight groove and in part by a tapering scrap or waste portion of the bar, substantially as described.

CHARLES HENRY PERKINS.

Witnesses:
R. W. COMSTOCK,
CHARLES R. STARK.